United States Patent [19]

Unkelbach et al.

[11] Patent Number: 4,755,302

[45] Date of Patent: Jul. 5, 1988

[54] METHOD AND APPARATUS FOR MATRIX MAGNETIC SEPARATION

[75] Inventors: Karl-Heinz Unkelbach, Cologne; Gerhard Schmitz, Engelskirchen; Hans-Dieter Wasmuth, Essen; Hans Bender, Leverkusen, all of Fed. Rep. of Germany

[73] Assignee: Klockner Humboldt Deutz Aktiengesellschaft, Fed. Rep. of Germany

[21] Appl. No.: 853,183

[22] Filed: Apr. 17, 1986

[30] Foreign Application Priority Data

Apr. 17, 1985 [DE] Fed. Rep. of Germany ....... 3513801

[51] Int. Cl.[4] ............................................. B01D 35/06

[52] U.S. Cl. ......................................... 210/695; 55/3; 55/100; 209/214; 209/223.2; 209/228; 209/232; 210/797; 210/222; 210/330; 210/334

[58] Field of Search ................. 55/2, 3, 100; 210/695, 210/791, 797, 222, 223, 324, 327, 330, 334; 209/214, 216, 217, 219, 221, 222, 223.1, 223.2, 224, 226, 228, 229, 231, 232

[56] References Cited

U.S. PATENT DOCUMENTS

| | | | |
|---|---|---|---|
| 3,935,095 | 1/1976 | Susse et al. | 209/222 |
| 4,052,310 | 10/1977 | Nolan | 210/222 |
| 4,153,542 | 5/1979 | Bender et al. | 210/222 X |
| 4,208,277 | 6/1980 | Lofthouse et al. | 210/222 X |
| 4,298,478 | 11/1981 | Watson et al. | 210/695 |
| 4,455,228 | 6/1984 | Jones | 210/222 |

FOREIGN PATENT DOCUMENTS

| | | | |
|---|---|---|---|
| 274231 | 1/1965 | Australia | 210/222 |
| 472326 | 6/1974 | Australia | 210/222 |
| 2410001 | 9/1974 | Fed. Rep. of Germany | 210/223 |
| 1094646 | 12/1967 | United Kingdom | 210/223 |
| 2016304 | 9/1979 | United Kingdom | 210/223 |

OTHER PUBLICATIONS

Parker, M., "Recent Developments in High Field Magnetic Separation", Electrical and Magnetic Separation and Filtration Technology, (May 1974), p. 3.

*Primary Examiner*—Richard V. Fisher
*Assistant Examiner*—W. Gary Jones
*Attorney, Agent, or Firm*—Hill, Van Santen, Steadman & Simpson

[57] ABSTRACT

A method and mechanism for the magnetic separation of material from a fluid containing magnetic and non-magnetic material, passing the fluid through matrix containing canisters wherein the canisters are carried on a turret which moves axially and rotatably. In four quadrilaterally arranged locations, two canisters are supported in a separation position within coils until they are filled and then are moved axially and rotationally to cleansing stations while cleansed canisters are rotated and moved axially up into the separation stations. A distribution head connects to the turret for delivery of magnetic material containing fluid and cleansing fluid.

14 Claims, 1 Drawing Sheet

METHOD AND APPARATUS FOR MATRIX MAGNETIC SEPARATION

BACKGROUND OF THE INVENTION

The invention relates to improvements in methods and apparatus for separation of a magnetic material from a suspension, and more particularly to utilizing a matrix through which is passed a fluid stream of magnetizable and non-magnetizable particles with the matrix contained in a canister positioned in a magnetic field. When a matrix has been loaded with magnetic material, the canister is removed and a new canister with a matrix is positioned in the magnetic field while the previously loaded canister is cleared of magnetic material.

In accordance with the practice of the invention, a strong field separation is employed wherein a canister contained matrix is utilized with the matrix being a low-retentivity material. The matrix within the canister is placed within a magnetic coil which is flooded by a fluid suspended particle solution and strong magnetic field gradients rise at the surface of the structure material as a consequence of the magnetization thereof. These magnetic field gradients together with the superimposed field exercise strong attractive forces on the magnetizable particles and retain such particles at the matrix surface. When the matrix is loaded, it must be cleaned. In accordance with prior practices, the magnetic field is shut off or the matrix removed outside of the environment of the magnetic field for cleaning. To contain the fluid the matrix is located in a container which preferably is of a size to fit within a coil generating the magnetic field and the container is provided with connections for the intake and discharge of the fluid suspension.

Matrix magnetic separators are utilized in what is known as a reciprocating canister method (RC method). This is a cyclical method. The adhering particles must be removed from the matrix at regular intervals from the canisters traversed by the fluid suspension. It has been proposed that the field not be disconnected but that the canister be withdrawn from the field, utilizing a full field, and that the canister and matrix be washed outside of the field. See, M. Parker, "Recent Developments in High Field Magnetic Separation", page 3, in Electrical and Magnetic Separation and Filtration Technology, Antwerp, May 1984.

Devices which have attempted to perform a magnetic separation in the manner above discussed, and apparatus suitable for this purpose contains a hydraulic actuated canister which also contains dummy canisters which are necessary for the compensation of the forces when the matrix is withdrawn from the magnetic coil. Although the withdrawal of the loaded matrix and replacing it with an unloaded matrix that is arranged in series, the canister pull shortens the dead or nonoperational time which is the time in which no magnetic separation can occur because the canister is displaced and the particle suspension has been switched to a wash agent location. Considerable exertions are needed in order to bring the matrix into an unmagnetized condition. For example, a magnetic shielding in a de-magnetization coil are employed since magnetic coils of the type normally employed exhibit considerable leakage fields in the outside space along their axis. Further devices which effect the intake and discharge of the fluid suspension and of the wash agent into the canister must be arranged to operate on select canisters and to by-pass other canisters arranged in a series. They must take into consideration the magnetic coil and this reduces the available room for the magnetic separation.

In accordance with methods previously employed, the suspension flows through the full cross-section of the matrix only in a direction parallel to the coil axis. This requires an involved design of the coil or in turn of the magnetic yoke in order to maintain a uniform field strength over the cross-section of the suspension.

It is accordingly an object of the present invention to provide a method and apparatus wherein the magnetic separation process has a very short inoperative or dead time and wherein an apparatus is employed which is durable and rugged and capable of continued operation without repair or attention, and wherein the mechanism insures the optimum attraction of a variety of magnetic particles with simple magnetic coils.

A further object of the invention is to provide an improved method and apparatus for magnetic separation in a matrix containing canister wherein the matrix can be cleaned and the continuous cleaning of the matrix to provide a fresh canister to move into the magnetic field is done in a manner so that it does not shorten the inoperative time when a canister is effectively within the magnetic field.

In accordance with the principles of the invention, a plurality of canisters are supported or mounted such that the canisters are positioned parallel to the axis of the magnetic field and the axis of introduction into the operative position before introduction into the magnetic coil. The introduction and discharge of the fluid into and out of the canister proceeds from one axial end. For changing the canister, the canister is moved axially from within the coil and is thereafter pivotally or rotationally moved to a cleaning position and the same rotation or pivotal movement moves an unloaded fresh canister into the coil axis for separation. The unloaded canister is introduced into the magnetic coil in an axial motion from the same direction relative to the coil but in the opposite direction of axial movement relative to the direction in which the previous loaded canister was withdrawn. The mechanism is arranged such that the inlet and outlet of the fluid suspension of magnetic material is at the same end of the canister. The canisters are mounted on a turret arrangement so that they move between positions wherein in one position they are traversed by the fluid suspension of magnetic material and in the other position by a cleaning fluid. In other words, the canisters are moved in the same axial direction, but at a different location, into their effective separation position or their effective cleaning position.

In accordance with the principles of the invention, substantial advantages are achieved over prior art arrangements in that essentially only four movements of the canister are necessary. The movements are axial withdrawal of the canister from the magnetic field, lateral pivotal rotary movement of the loaded canister (relative to the axis of the magnetic field), simultaneous pivotal movement of an empty canister into the axis of the magnetic field and an axial introduction of the canister into the magnetic field from the same side as the withdrawal of the canister. A feature of the arrangement is that it is thereby not necessary to shut off the magnetic field and this is particularly desirable for the use of a superconductive magnet. In the movement of the canisters from the magnetic field to the cleaning location, a turret type of arrangement is preferred wherein the axis of the rotary turret is parallel to the principal axis of the magnetic field. In the arrangement utilized, no valves are required which must be additionally actuated. By contrast, the introduction and exhaust of the suspension into and out of the canister can be controlled in a simplified way with a distributor head which automatically connects to the various canisters in their positions with rotary movement of the turret.

In accordance with the invention, a rotary valve head is employed which allows the canisters to be raised and lowered axially and this is equivalent to or superior to a design wherein the magnets must be raised and lowered and the canisters only are moved in a lateral or rotatable movement or wherein the canisters are stationary and the magnetic coils are moved in their axial direction and perpendicular thereto.

To meet the requirements of certain operations, the loaded canisters are removed as a whole and disposed of. This occurs, for example, when mild radioactive substances are separated. In the majority of applications, however, a loaded canister is cleaned or washed for regeneration. In the simplest case, two canisters are provided for such an operating mode, one being loaded while the other is being cleaned. When the cleanin lasts longer than the loading, a plurality of washing stations are provided for each filling station. With a rotary turret and a stationary valve head, the washing as well as the supplying of magnetic fluid to the canisters can be sequenced automatically with rotation of the turret. Thus, as will be seen by the drawings, two filling positions and at least two cleaning positions can easily be accommodated with a rotary turret.

In addition to the foregoing simplified slurry management and washing, the withdrawal and introduction of the canisters into the magnetic field in a manner which always proceeds from the same axial side also results in that the suspension can be arranged to traverse the magnetic field at least twice. This accomplishes uniform collection of the magnetic material with a magnetic field strength that can vary when coils that are simplified in construction are utilized. In accordance with the principles of the invention, this feature is additionally exploited by providing a canister with chambers. Such chambers are arranged for the sequential flow of fluid and in the sequential chambers, different matrices can be employed. Matrices of different structure and different spatial location with respect to the magnetic field can be utilized arranged so that they are optimum for the separation of specific particles. Thus, if a field strength is employed which is not entirely uniform which is obtainable with simple short coils, such structure does not represent a disadvantage but can instead be used for improving the separating results. It is also possible to lengthen the path that the slurry travels in the canister and this accomplishes a longer exposure to the magnetic field without providing long magnetic coils.

The arrangement of the method and structure is rugged and accommodates servicing. The wash positions are outside of the magnet, and are therefore available for dismantling and changing the matrices. The solenoid magnets and the mechanical structures required which employ a raisable and a rotatable rotary plate with a distributor head can be constructed relatively simple and inexpensive.

Although the spatial arrangements within the concepts of the invention can be varied, an arrangement wherein the coil axis is vertically arranged and the canisters are introduced from below has the advantage that the weight of the canisters and of the support means compensates for the magnetic force with which the canisters are held within the magnetic field of the coil. Moreover, the fact that the magnetic coils are charged by introducing the canisters from only one side enables a compensation of the magnetic force by springs or by dummy loads that are introduced and withdrawn from the other side but which have no fixed connection to the canisters.

During the washing process, the canisters are no longer positioned in the axial extension of the coil but are laterally next to it. Since the lateral scatter field is rather low, measures which heretofore were required for shielding can be eliminated or easy to accomplish.

Other objects, advantages and features will become more apparent with the teaching of the principles of the invention in connection with the disclosure of the preferred embodiment in the specification, claims and drawings, in which:

DESCRIPTION OF THE PREFERRED EMBODIMENTS

Figure 1:
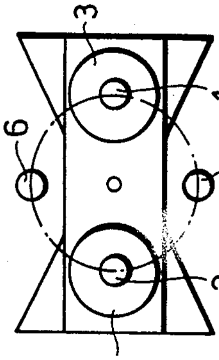
FIG. 1 is a schematic plan view illustrating the location of the canisters in the loading areas and in the washing areas.

FIG. 1 illustrates the magnetic separator in a schematic form wherein two loading stations are provided and two cleaning stations. Four canisters are illustrated at 1, 2, 5, and 6. The canisters 1 and 2 are situated in the "warm" bore of two superconductive solenoids 3 and 4 in which field strengths of from 5 to 8 T prevail. A warm bore in this context means it is a matter of an opening in the cryostat that is freely accessible from the outside.

Figure 2:
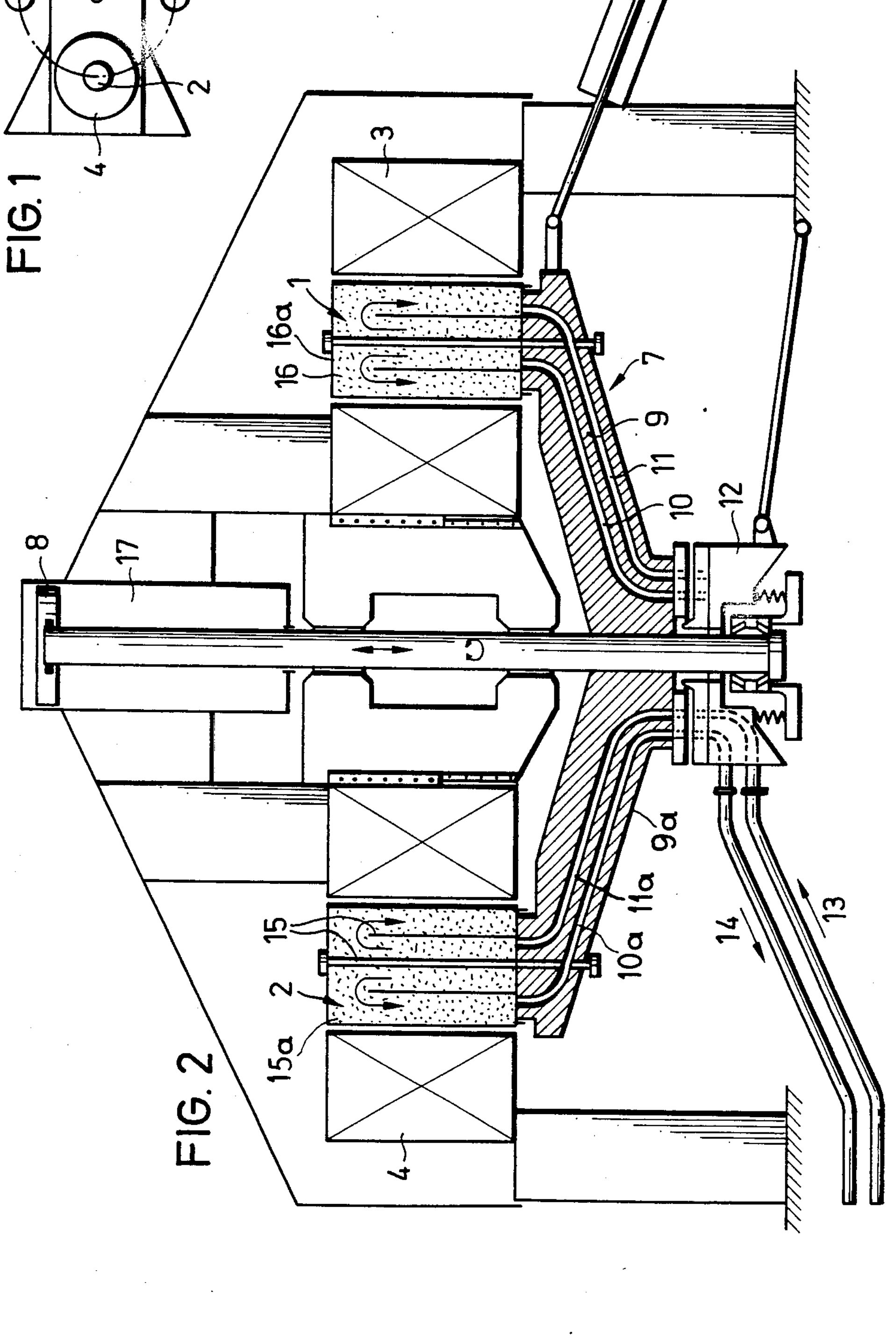
FIG. 2 is a vertical sectional view taken through the axis of the turret supporting the canisters at the loading location.

With reference to FIG. 2, the apparatus is shown in greater detail. The canisters 1 and 2 which are in the position within the coil wherein the magnetic material is removed from the fluid, are mounted on a rotary turret 7. The turret is not only rotary but it is vertically movable by suitable means such as a lifting cylinder containing a piston 8 therein. Suitable hydraulic or air connections are connected to the ends of the cylinder to supply fluid under pressure into the chamber 17 above and below the piston 8. In the position of FIG. 2, fluid pressure beneath the piston supports the turret in the position shown. When the turret is to be lowered, the fluid beneath the piston is exhausted and pressurized fluid is introduced above the piston. This is accomplished through suitable pressure lines and valving mechanism as will be understood by those versed in the art. The turret has a central axis located at the center of the rod of the piston 8, and the turret rotates about this axis and moves vertically parallel to this axis. The canisters 1, 2, 5 and 6 are located radially equidistant from this axis, are let down or moved axially parallel to this axis, rotated about this axis and again lifted vertically parallel to this axis.

The turret is provided with arms leading to each of the canisters. FIG. 2 illustrates in detail arms 9 and 9*a* which support the canisters 1 and 2 respectively. Similar arms, not shown, support the canisters 5 and 6, it being understood that the arms extend radially from the rotary turret. Suitable means are provided for indexing the turret in a rotary motion and this can be accomplished by a known gearing or cross-head mechanism for indexing the turret 90° or a quarter of a turn for each index. A stationary supply head 12 has passages therethrough to communicate to the passages through the arms and supply fluid containing magnetic material to the canisters in the position of FIG. 2, and to supply cleaning fluid to the canisters 5 and 6 which represent the cleaning stations.

As shown in FIG. 2, the slurry which is the fluid containing magnetic and non-magnetic material is supplied to the canisters through line 13 to flow through the canisters and is removed from the canisters through the line 14. Cross-passages in the head 12 are arranged to supply to the lines in the turret arms 10 and 10' which supply the canisters and to permit removal of fluid through the lines 11 and **11*a*** which accommodate the return flow of the fluid after the magnetic material has been removed in the matrices of the canisters.

Similar arms support the other two canisters on the turret and these arms will have passages similar to the passages 10 and 11, and therefore need not be shown in detail.

The canisters 1 and 2 are illustrated in cross-section and they are arranged on the horizontal platform supports on the arms such that they are held within the circular pockets within the coils 3 and 4. The canisters have partitions 15 therein so as to cause the magnetic material containing slurry to flow axially back and forth through the canisters. Since the field of the relatively short coils 3 and 4 is not uniform, the chambering arrangement provided by the partitions 15, as shown for the canister 2 and the chambers 16 as shown for the canister 1, can be arranged to be particularly suited for specific slurries provided with a special matrix dependent on the slurry to be handled. In this manner separating can be optimumly carried out for a slurry is that is not particularly uniform in composition. This is possible because a relatively long flow path can be established. In this arrangement, the relatively coarse or relatively highly magnetizable particles can be separated first. The chambers can be arranged so that a repeated axial up and down flow can be obtained without difficulty.

After the canisters are introduced into the first positions which are within the coils and the matrix material shown at **15*a* and 16*a* becomes loaded with magnetic material, the canisters are removed axially by being shifted in a downward direction. To accomplish this the piston 8 moves downwardly in the cylinder chamber 17 so that the entire assembly supporting the canisters moves axially downwardly. When the canisters descend sufficiently far so that they clear the coils, the turret is rotated 90°. This brings the canisters 5 and 6 which have been in the wash station shown in FIG. 1, into position beneath the coils. The piston 8 is then raised to move the canisters 5 and 6 with the cleansed matrices up into the loading station shown in FIG. 2**.

This rotary movement of the turret aligns the passages 10 and 11, and **10*a* and 11*a* with passages in the head 12 that direct and remove cleaning fluid into the canisters. The cleaning fluid, of course, removes the collected magnetic material which is directed to a collecting area in a known manner. The rotary movement also connects passages in the arms supporting the canisters 5 and 6 to the lines 13 and 14 for slurry supply and removal so that as soon as the cleaned canisters are moved up into the loading station, slurry can begin flowing through the canisters. This is accomplished through a suitable valving mechanism which may be arranged to automatically shut off when the turret is lowered and again permit flow of fluid when the turret is raised to the operative position of FIG. 2**.

The brief axial lowering of the turret, rotating through 90° and again raising consumes only a very short period of time so that only a brief interruption occurs in the continued removal of magnetic material from the slurry. A typical arrangement is such that the changing of canister positions can be accomplished in less than one second.

In operation the mechanism provides for positioning a first canister with a matrix in a first position within a magnetic coil as shown by the canisters 1 and 2 in FIG. 2. Second canisters are positioned in locations 5 and 6 of FIG. 1 wherein their matrices are washed so that this results in an unloaded matrix. A magnetic material containing fluid is introduced into one end and withdrawn from the same axial end of the canisters through the passages in the arms 9 and **9*a* as shown in FIG. 2. When the canisters become loaded, the canisters move axially out of the coils from their first position and thereafter in a rotary motion, move to the second position as shown by the canisters 5 and 6** and are lifted axially into the matrix cleansing position.

Thus, it will be seen that there has been provided an improved magnetic separation arrangement which meets the objectives and advantages above set forth, and which enables an improved result in the better separation operation. Also, the efficiency of the unit permits continuous operation without operator attention and without repair or replacement providing improvements over devices and methods heretofore available.

We claim as our invention:

1. The method of magnetic separation wherein a fluid stream containing magnetic magnetizable and non-magnetizable particles is passed through a matrix-filled canister positioned in a magnetic coil and a canister with a matrix loaded with magnetic material is replaced with a canister having an unloaded matrix, comprising the steps:

positionting a first conister having an axis with a matrix being loaded in a first position within a magnetic coil;

positioning a second canister with an unloaded matrix in a second position with an axis parallel to the axis of the first canister;

said conisters positioned equidistant from a central axis;

introducing a magnetic material containing fluid from one end and withdrawing the fluid from the same end of the first canister;

moving the first canister axially out of the coil out of the first position and thereafter moving the canister in a rotary motion to a location beneath the second position and thereafter axially into the second position; and simultaneously moving the second cansiter axially out of the second position and thereafter rotationally and then axially into the first position, said canisters moving axially parallel to said central axis and rotating about said central axis.

2. The method of magnetic separation wherein a fluid stream containing magnetic and non-magnetic particles is passed through a matrix-filled canister positioned in the magnetic coil and a canister with a matrix loaded with magnetic material is replaced with a canister having an unloaded matrix in accordance with the steps of claim 1:

wherein the first and second canisters are moved between said first and second positions about the same axis of rotation being said central axis.

3. The method of magnetic separation wherein a fluid stream containing magnetic and non-magnetic particles is passed through a matrix-filled canister positioned in the magnetic coil and a canister with a matrix loaded with magnetic material is replaced with a canister having an unloaded matrix in accordance with the steps of claim 1:

wherein the fluid stream first flows into the canister in the first location in the region of the coil axis and counterflows outwardly of the coil axis.

4. The method of magnetic separation wherein a fluid stream containing magnetic and non-magnetic particles is passed through a matrix-filled canister positioned in the magnetic coil and a canister with a matrix loaded with magnetic material is replaced with a canister having an unloaded matrix in accordance with the steps of claim 1:

wherein the fluid is passed through the canister in multiple paths in the direction of magnetic field moving concentrically from the axis of the canister toward the outside thereof.

5. The method of magnetic separation wherein a fluid stream containing magnetic and non-magnetic particles is passed through a matrix-filled canister positioned in the magnetic coil and a canister with a matrix loaded with magnetic material is replaced with a canister having an unloaded matrix in accordance with the steps of claim 1:

including means for directing a wash fluid flow through the canister in said second position.

6. The method of magnetic separation wherein a fluid stream containing magnetic and non-magnetic particles is passed through a matrix-filled canister positioned in the magnetic coil and a canister with a matrix loaded with magnetic material is replaced with a canister having an unloaded matrix in accordance with the steps of claim 1:

wherein cleaning of the matrix of the canister is performed in a plurality of positions including said second position..

7. The method of magnetic separation wherein a fluid containing magnetic and non-magnetic particles is passed through a matrix-filled canister positioned in the magnetic coil and a canister with a matrix loaded with magnetic material is replaced with a canister having an unloaded matrix in accordance with the steps of claim 1:

wherein the fluid stream of magnetic material is successively passed through regions in the canister in the first position with the canister having regions of differing matrix.

8. A mechanism for the magnetic separation of material from a fluid carrying magnetic and non-magnetic material passing the fluid through a matrix containing canister, comprising in combination:

a coil generating a magnetic field about a first position located radially of a central axis a support means movable rotationally and axially relative to said central axis having a first position for a matrix containing canister in said first position for separating magnetic material;

means for delivering and removing magnetic material containing fluid axially into and ut of the same end of the canister in said first position;

a second position for a replacement canister on said support means; and means moving said support means axially and then rotationally relative to said central axis to carry the first canister out of the first position and into the second position and the second canister out of the second position into the first position.

9. A mechanism for the magnetic separation of material from a fluid carrying magnetic and non-magnetic material passing the fluid through a matrix containing canister in accordance with the structure of claim 8:

wherein the support moving means is in the form of a rotational turret rotatable about said central axis.

10. A mechanism for the magnetic separation of material from a fluid carrying magnetic and non-magnetic material passing the fluid through a matrix containing canister in accordance with the structure of claim 8:

wherein a fluid distributor head is positioned stationarily to distribute fluid to each of said first and second canisters in the first position.

11. A mechanism for the magnetic separation of material from a fluid carrying magnetic and non-magnetic material passing the fluid through a matrix containing canister in accordance with the structure of claim 8:

wherein the coil includes a super-conductive magnet.

12. A mechanism for the magnetic separation of material from a fluid carrying magnetic and non-magnetic material passing the fluid through a matrix containijg canister in accordance with the structure of claim 8:

wherein the interior of the canister has means defining a plurality of chambers for providing a suspension flow in the magnetic field.

13. A mechanism for the magnetic separation of material from a fluid carrying magnetic and non-magnetic material passing the fluid through a matrix containing canister in accordance with the structure of claim 8:

wherein each canister has means defining a plurality of concentric chambers arranged for successive reversal of axial flow through the canister.

13. A mechanism for the magnetic separation of material from a fluid carrying magnetic and non-magnetic material passing the fluid thrgh a matrix containing canister in accordance with the structure of claim 8:

wherein each canister has means defining a plurality of concentric chambers arranged for successive reveral of axial flow through the canister.

14. A mechanism for themagnetic separation of material form a fluid carrying magnetic and non-magnetic material passing the fluid through a matrix containing canister, comprising in combination:

a rotary turret supported on a central axis having quadrilaterally arranged support positions thereon relative to said central axis, two of said positons providing first separation locations diametrically opposed and the two remaining positons providing diametrically opposed cleaning locations;

lines carried by the turret connecting to the locations;

magnetic field generating coils at the separation locations;

a fluid conducting stationary head communicating with the turret to dirct magnetic material containing fluid to the canisters at the separation location and washing fluid to the canisters at the cleaning location;

a vertical operative piston and cylinder connected to the turret to move the canister axially relative to said central axis out of the separation location and to move a cleansed cansiter into the separation location;

means driving the turret in rotation about said central axis to change the position of the canisters after they have been moved axially; and fluid supply lines leading to the head for the turret.

* * * * *